United States Patent
Yao

(10) Patent No.: US 8,322,734 B2
(45) Date of Patent: Dec. 4, 2012

(54) WHEEL AXLE LIFTER

(75) Inventor: Yu-Hsia Yao, Taichung (TW)

(73) Assignee: Chuan Ta King Enterprise Co., Ltd., Taichung (TW)

(*) Notice: Subject to any disclaimer, the term of this patent is extended or adjusted under 35 U.S.C. 154(b) by 0 days.

(21) Appl. No.: 13/228,010

(22) Filed: Sep. 8, 2011

(65) Prior Publication Data

US 2012/0061936 A1    Mar. 15, 2012

(30) Foreign Application Priority Data

Sep. 15, 2010 (TW) ................................ 99217908 U

(51) Int. Cl.
*B62D 61/12* (2006.01)
*B60G 11/26* (2006.01)
(52) U.S. Cl. ................................ 280/86.5; 280/124.116
(58) Field of Classification Search .................. 280/86.5, 280/124.116, 124.17, 124.175, 5.514, 6.15, 280/6.157
See application file for complete search history.

(56) References Cited

U.S. PATENT DOCUMENTS

| | | | | |
|---|---|---|---|---|
| 3,970,293 A * | 7/1976 | Sweet et al. | .................... | 267/31 |
| 5,018,755 A * | 5/1991 | McNeilus et al. | ........... | 280/81.1 |
| 5,058,916 A * | 10/1991 | Hicks | ............................ | 280/86.5 |
| 5,536,036 A * | 7/1996 | Ehrlich | .................. | 280/124.128 |
| 5,655,788 A * | 8/1997 | Peaker | ......................... | 280/86.5 |
| 6,371,499 B1 * | 4/2002 | Konop | .......................... | 280/86.5 |
| 6,471,223 B1 * | 10/2002 | Richardson | .................. | 280/86.5 |
| 6,805,369 B2 * | 10/2004 | Galazin | ................. | 280/124.116 |
| 7,360,773 B2 * | 4/2008 | Gottschalk | .................... | 280/86.5 |
| 7,748,724 B2 * | 7/2010 | Gottschalk | .................... | 280/86.5 |
| 7,854,436 B2 * | 12/2010 | Hock et al. | .................. | 280/86.5 |
| 2011/0272907 A1 * | 11/2011 | Stephani | ................ | 280/124.116 |

* cited by examiner

*Primary Examiner* — Eric Culbreth
*Assistant Examiner* — George Spisich

(57) ABSTRACT

The present invention provides a wheel axle lifter used for being adapted to be disposed with auto-mobiles. The wheel axle lifter comprises a fixing portion, a first airbag and a suspending arm. The fixing portion is used for being disposed with a body of the auto-mobile. The first airbag disposed with the fixing portion comprises at least two rollers. The two rollers are positioned integrally. One end of the suspending arm is pivotally disposed with the fixing portion. The suspending arm is disposed with a wheel axle and is able to move between a first position and a second position. Each one of the two rollers rotationally contacts with the suspending arm when the first airbag drives the two rollers upward to abut against the suspending arm so that the suspending arm moves to the second position.

12 Claims, 5 Drawing Sheets

WHEEL AXLE LIFTER

BACKGROUND OF THE INVENTION

1. Field of the Invention

The present invention relates to the field of a wheel axle lifter used for being adapted to be disposed with auto-mobiles.

2. Description of the Prior Art

Speaking of auto mobiles such as trucks and trailers, a body of an auto-mobile is disposed with pairs of wheels to even the loading weight for a reason that the auto-mobile has to transport cargos with huge sizes and heavy weight on roads. However, the auto-mobile needs only two pairs of the wheels for driving on the roads when the auto-mobile loads no cargo. Under this condition of loading no cargo, the auto-mobile such as trucks and trailers would be disposed with a wheel axle lifter to lift up other pairs of the wheels so that the pairs of the wheels lifted would not contact with the ground, decreasing friction between the wheels and the ground and consumption of power needed for overcoming the friction. Thus, a radius on making a U-turn can also be smaller so that a head of the auto-mobile such as trucks or the trailers can make a U-turn easier and with more convenience.

However, the conventional wheel axle lifters would be known by referring to EP0941915. According to this patent, a rubber mat is dispose on a top of an airbag. The rubber mat would abut against a suspending arm and drive the suspending arm to move when the airbag is inflated with or releases air. Because an abutting area where the rubber mat abuts against the suspending arm is smaller, a loading pressure is greater for the rubber mat and the suspending arm. As a result, a steel spring is disposed between the supporting frame and the airbag to stabilize the move of the airbag. In the long term, the use of the steel spring still causes a great possibility of being damaged to the airbag. And the great friction between the rubber mat and the suspending arm also lead the rubber mat and the suspending arm to be damaged easily. Furthermore, as a description of EP1902933, the bearing frame has plural holes used for adjusting a distance between the wheel axle and the body of the auto-mobile. And the lifting device has a bearing used for abutting against the suspending arm. The lifting device drives the bearing to push the suspending arm moving so that the wheel axle moves upwardly or downwardly. Because the abutting area where the bearing abuts against the suspending arm is smaller, a loading pressure is greater for the rubber mat and the suspending arm, and the lifting device would be deformed easily. Under a condition of loading no cargo, the lifting device still maintains a condition of pushing the suspending arm in order to lift the wheel axle for a long time. Apart from being deformed, the lifting device tends to be damaged easily on account of pushing for a long time. And a cost on repairing is increased.

As such, the present invention is arisen to obviate or at least mitigate the above mentioned disadvantages.

SUMMARY OF THE INVENTION

The main object of the present invention is to provide a wheel axle lifter with better effect of lifting and lowering the wheel axle, and the wheel axle lifter is used for being adapted to be disposed with auto-mobiles.

To achieve the above, the wheel axle lifter of the present invention can be used for being adapted to be disposed with auto-mobiles such as trucks and trailers. The auto-mobile comprises a body of the auto mobiles and a wheel axle, and the wheel axle lifter comprises a fixing portion, a first airbag and a suspending arm. The fixing portion is disposed with the body of the auto mobile, and the first airbag is disposed with the fixing portion. The first airbag has at least two rollers, and the two rollers are positioned with spaces apart.

One end of the suspending arm is pivotally disposed with the fixing portion. The suspending arm is disposed with the wheel axle and is movable between a first position and a second position.

Note that each one of the two rollers are capable of rotating, and the two rollers contact with the suspending arm when the first airbag drive the two rollers, upward to abut the suspending arm, so that the suspending arm 4 moves to the second position.

As such, because the first airbag includes at least two rollers, each one of the two rollers abuts against the protecting member by more contacting area. And the loading pressure of the first airbag becomes smaller when driving the suspending arm to move. Also, the first airbag can lift the wheel axle up easier and more stable in a process of operation. Rotating ability for the two rollers decreases a friction in a process of pushing the suspending arm to move. As a result, the two rollers and the suspending arm would not be damaged easily.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
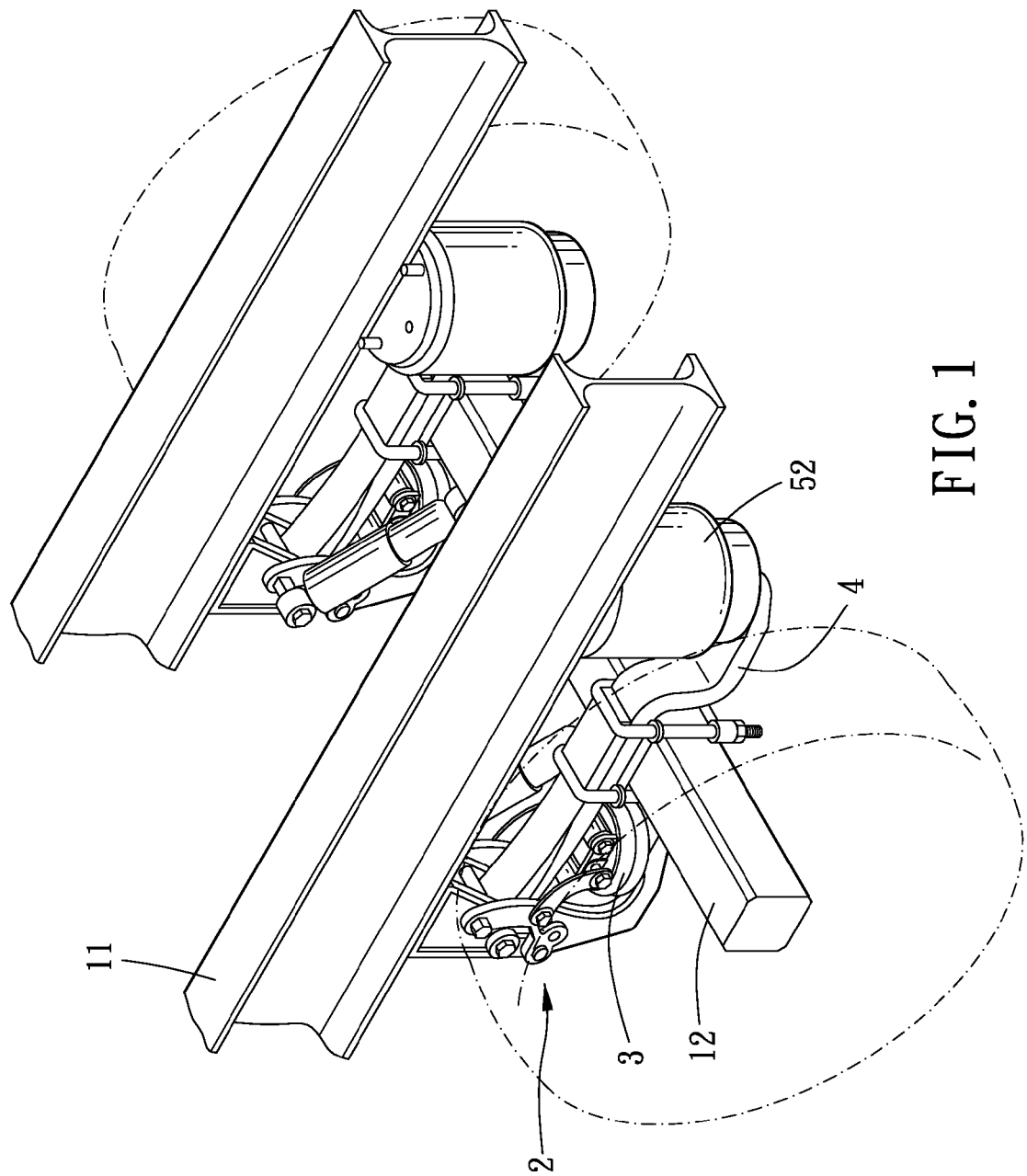
FIG. 1 is a stereogram of a wheel axle lifter in accordance with the present invention.
Figure 2:
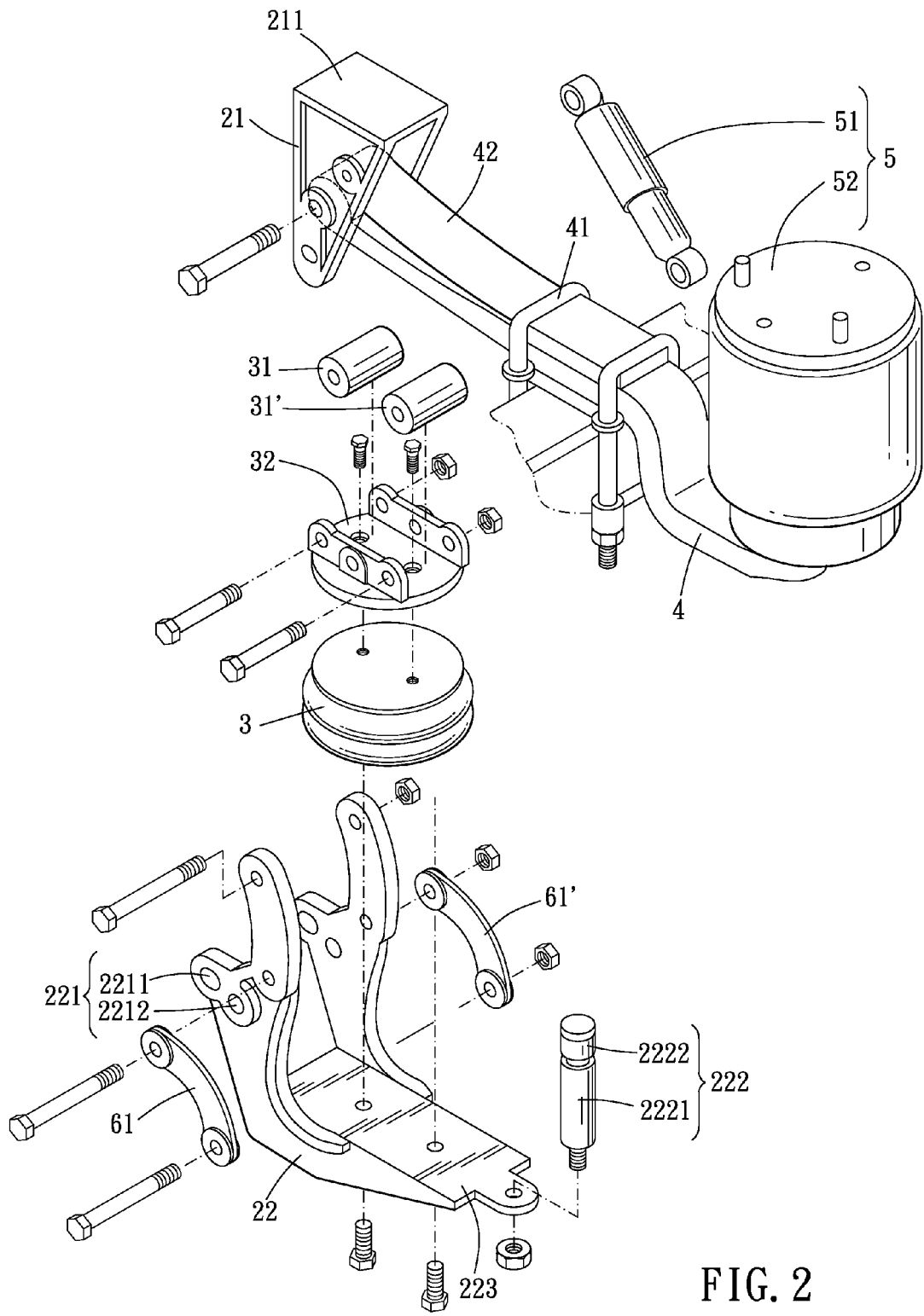
FIG. 2 is a decomposition drawing of a wheel axle lifter in accordance with the present invention.

Please refer to FIG. 1 and FIG. 2, the wheel axle lifter of the present invention can be used for being adapted to be disposed with auto-mobiles such as trucks and trailers. The auto-mobile comprises a body 11 of the auto mobiles and a wheel axle 12, and the wheel axle lifter comprises a fixing portion 2, a first airbag 3, a suspending arm 4 and a damp mechanism 5.

The fixing portion 2 is disposed with the body 11 of the auto mobile, and the first airbag 3 is disposed with the fixing portion 2. The first airbag 3 has at least two rollers 31, 31', and the two rollers 31, 31' are spaced apart. One end of the suspending arm 4 is pivotally disposed with the fixing portion 2. A middle portion of the suspending arm 4 is disposed with the wheel axle 12. The suspending arm 4 is movable between a first position and a second position. Note that each one of the two rollers 31, 31' are capable of rotating, and the two rollers 31, 31' contact the suspending arm 4 when the first airbag 3 drive the two rollers 31, 31' upward to abut against the suspending arm 4, so that the suspending arm 4 moves to the second position.

The damp mechanism comprises a bearing rod 51 and a second airbag 52, and the bearing rod 51 capable of pivoting is disposed between the fixing portion 2 and the wheel axle 12, the second airbag 52 is disposed at the end of the suspending arm 4 away from the fixing portion 2. The bearing rod 51 is an oil cylinder or a cylinder. As such, the bearing rod 51 and the second airbag 52 could absorb most of shock force of the body 11 when the auto-mobile is driven on a bumpy road. Thus, an effect of shock absorption is well performed to protect the body 11 from producing heavily shock.

In a preferred embodiment of the present invention, the fixing portion 2 is composed of a supporting frame 21 and a bearing base 22. The supporting frame 21 is used for being disposed with the body 11. Preferably, the supporting frame 21 has a top surface 211 disposed with the body 11 to fix the supporting frame 21 with the body 11. The bearing base 22 is disposed with the supporting frame 21, and the bearing base 22 has an adjusting portion 221, and the adjusting portion 221 has a first adjusting hole 2211 and a second adjusting hole 2212. A position of the first adjusting hole 2211 is higher than a position of the second adjusting hole 2212 so that a height difference between the first adjusting hole 2211 and the second adjusting hole 2212 is used for adapting different distance between the wheel axle 12 and the body 11 according to various auto-mobiles of different design. One end of the supporting frame 21 where is away from the top surface 211 is disposed with one of the first adjusting hole 2211 and the second adjusting hole 2212. Besides, the bearing base 22 includes an abutting member 222 extends from a bottom 223 of the bearing base 22. The suspending arm 4 abuts against the abutting member 222 when the first airbag 3 releases air. Preferably, the abutting member 222 can have a joint portion 2221 and a modulating portion 2222. One end of the joint portion 2221 is firmly disposed on the bearing base 22, and the other end of the joint portion 2221 is disposed with the modulating portion 2222 so that the modulating portion 2222 can move upwardly and downwardly with respect to the joint portion 2221 to adjust an extending height of the modulating portion 2222. The suspending arm 4 and the wheel axle 12 can be firmly locked with each other by using a locking member 41. The suspending arm 4 includes a protecting member 42, and the protecting member 42 is used for preventing the suspending arm 4 from directly contacting with other components and being damaged by the friction.

On the other hand, the first airbag 3 includes a bottom base 32 screwed thereon, and each one of the two rollers 31, 31' can rotates on the bottom base 32 when the two rollers 31, 31' are disposed on the bottom base 32, so the first airbag 3 and the bottom base 32 can be replaced without telling two of them apart when only the first airbag 3 or the bottom base 32 is damaged. In the preferred embodiment, the wheel axle lifter of the present invention further comprises two pivoting members 61, 61' pivotally disposed between the bearing base 22 and the bottom base 32. And the pivoting member 61 is parallel to the pivoting member 61' so that each one of the two pivoting members 61, 61' strengthens a supporting ability to stabilize the move of the first airbag 3.

Figure 3:
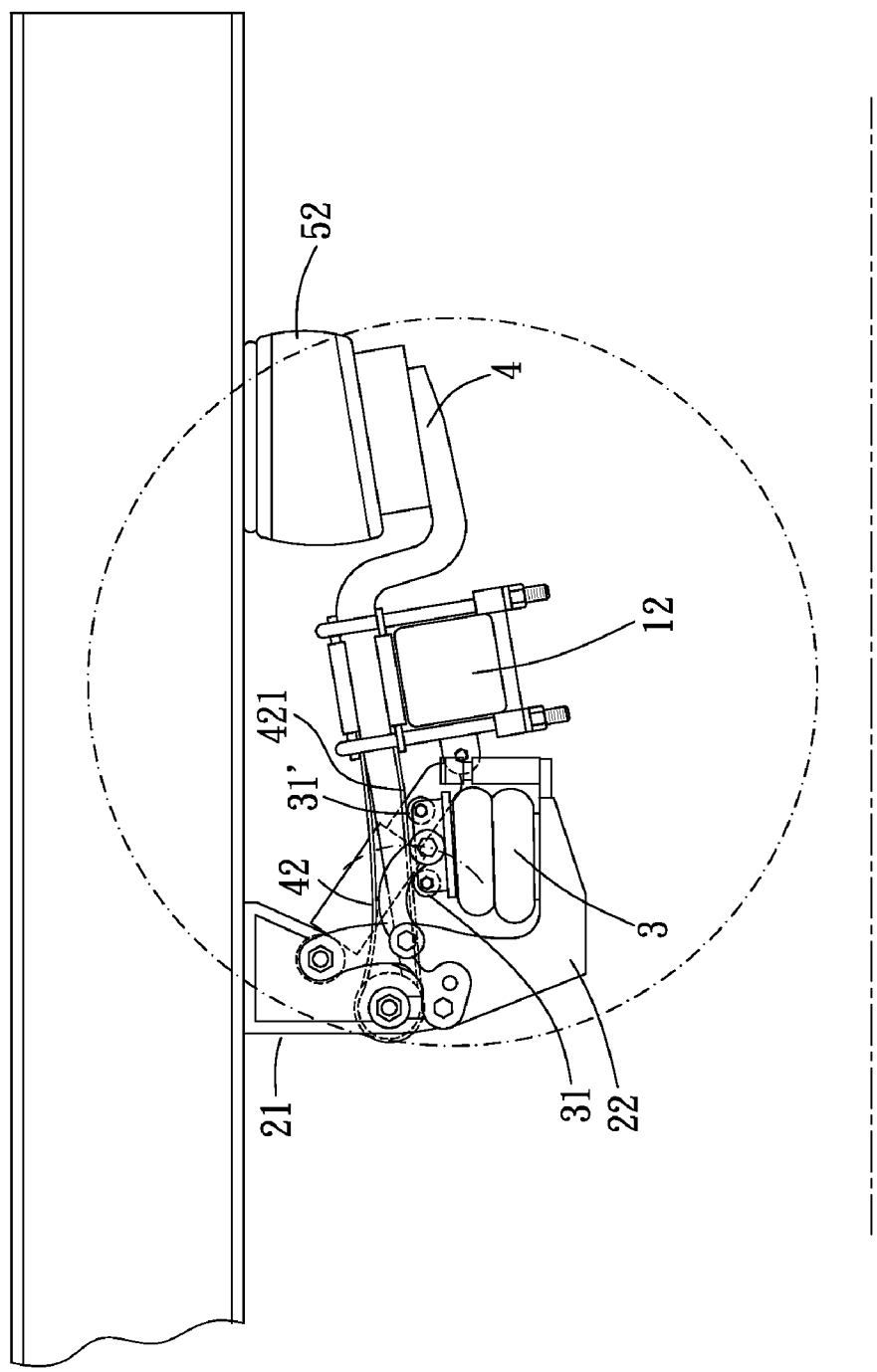
FIG. 3 is a schematic drawing showing a condition that a wheel axle lifter lifts a wheel axle in accordance with the present invention.
Figure 3A:
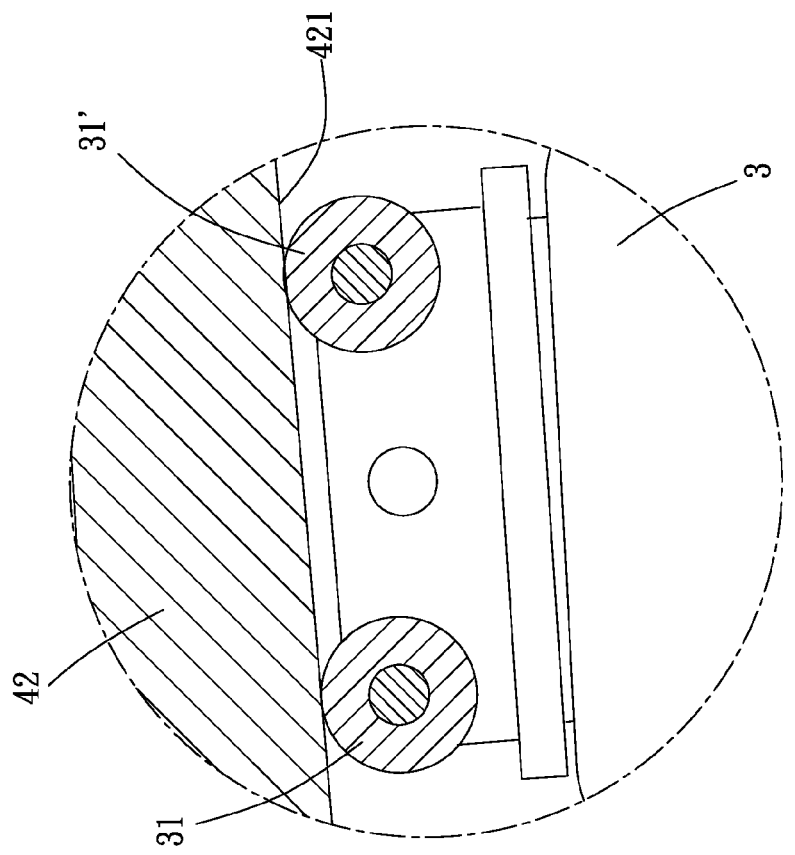
FIGS. 3A and 3B are enlarged drawings of a wheel axle lifter in accordance with the present invention.
Figure 3B:
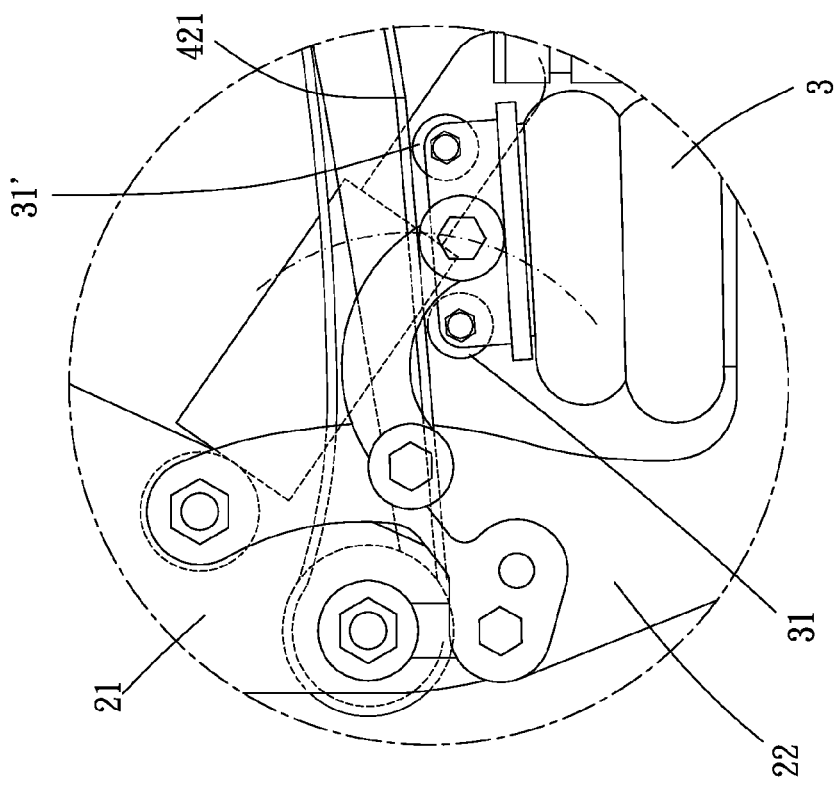

Please refer to FIG. 3, the wheel axle lifter of the present invention can be adapted to be disposed with auto-mobiles such as trucks or trailers. When the auto-mobile carries no cargo, the first airbag 3 is inflated by using an air pressure controller. At the same time, the second airbag 52 is deflated so that the first airbag 3 drives the suspending arm 4 moving upwardly to the second position, and the two rollers 31, 31' abut against a surface 421 of the protecting member 42. Then, the two rollers 31, 31' move along a longitude direction of the suspending arm 4 so as to increase a torque and lift up the wheel axle 12 easier. Moreover, as shown in FIG. 3A and 3B, a loading pressure is decreased for a reason that each one of the two rollers abuts against the protecting member 42 by more contacting area.

Figure 4:
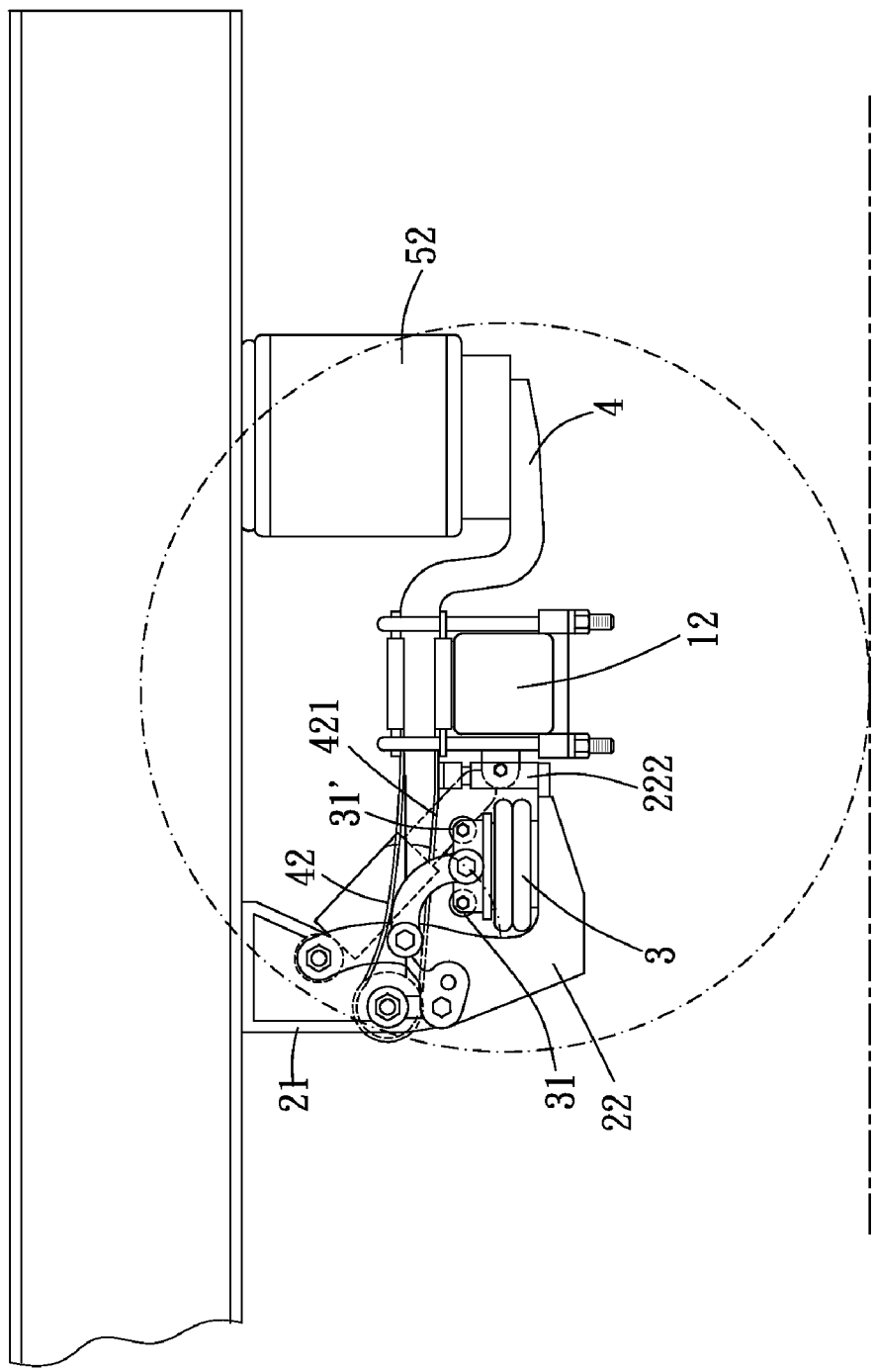
FIG. 4 is a schematic drawing showing a condition that a wheel axle lifter lowers a wheel axle in accordance with the present invention.

Please refer to FIG. 4, when the auto-mobiles such as trucks and trailers is driven on roads with carrying heavy cargos, the air pressure controller is used for deflating the first airbag 3. Meanwhile, the second airbag is inflated so that the suspending arm is lowered to the first position and abuts against the abutting member 222.

According to description mentioned above, the present invention provides a wheel axle lifter used for being adapted to be disposed with auto-mobiles. The wheel axle lifter uses the first airbag for driving the suspending arm to move, and each one of the two rollers abuts against the protecting member 42 by more contacting area. As a result, the loading pressure becomes smaller and the supporting strength is enhanced, so the first airbag can move stably when being driven by the suspending arm. Moreover, each of the two rollers abuts against the surface of the protecting member and moves along the longitude direction so that the torque becomes greater to lift the wheel axle up easier. As such, a rate of damaging and the stability of the structure are enhanced.

What is claimed is:

1. A wheel axle lifter used for being adapted for auto-mobiles, the auto-mobiles comprising a body of the auto mobiles and a wheel axle, and the wheel axle lifter comprising:
   a fixing portion, being disposed with the body of the auto mobiles;
   a first airbag, being disposed with the fixing portion, the first airbag having at least two rollers, the two rollers being spaced apart;
   a suspending arm, one end of the suspending arm being pivotally disposed with the fixing portion, a middle portion of the suspending arm being disposed with the wheel axle, the suspending arm being capable of moving between a first position and a second position;
   wherein each one of the two rollers is capable of rotating, the two rollers contact the suspending arm when the first airbag drives the two rollers upward to abut against the suspending arm, so that the suspending arm moves to the second position.

2. The wheel axle lifter of claim 1, wherein the fixing portion has a supporting frame and a bearing base, the supporting frame is disposed with the body of the auto mobiles, the bearing base has an adjusting portion, the adjusting portion has a first adjusting hole and a second adjusting hole, a position of the first adjusting hole is higher than a position of the second adjusting hole, the supporting frame is disposed with the adjusting portion.

3. The wheel axle lifter of claim 2, wherein the bearing base has an abutting member and at least a pivoting member, the abutting member extends upwardly from a bottom of the bearing base, the suspending arm abuts against the abutting member when the first airbag releases air, the pivoting member is capable of pivoting, the pivoting member is disposed between the bearing base and the first airbag.

4. The wheel axle lifter of claim 3, wherein the abutting member has a joint portion and a modulating portion, one end of the joint portion is disposed with the bearing base, the modulating portion is located at the other end of the joint portion, the modulating portion is capable of moving upwardly and downwardly with respect to the joint portion so as to adjust an extending height of the modulating portion; wherein the suspending arm abuts against the modulating portion when the first airbag releases air.

5. The wheel axle lifter of claim 4, wherein the wheel axle lifter further comprises a damp mechanism, the damp mechanism comprises a bearing rod and a second airbag, the bearing rod is capable of pivoting, the bearing rod is disposed between the fixing portion and the wheel axle, the second airbag is disposed at the end of the suspending arm away from the fixing portion.

6. The wheel axle lifter of claim 5, wherein the suspending arm comprises a protecting member, the protecting member wraps the end of the suspending arm close to the fixing portion.

7. The wheel axle lifter of claim 2, wherein the wheel axle lifter further comprises a damp mechanism, the damp mechanism comprises a bearing rod and a second airbag, the bearing rod is capable of pivoting, the bearing rod is disposed between the fixing portion and the wheel axle, the second airbag is disposed at the end of the suspending arm away from the fixing portion.

8. The wheel axle lifter of claim 7, wherein the suspending arm comprises a protecting member, the protecting member wraps the end of the suspending arm close to the fixing portion.

9. The wheel axle lifter of claim 3, wherein the wheel axle lifter further comprises a damp mechanism, the damp mechanism comprises a bearing rod and a second airbag, the bearing rod is capable of pivoting, the bearing rod is disposed between the fixing portion and the wheel axle, the second airbag is disposed at the end of the suspending arm away from the fixing portion.

10. The wheel axle lifter of claim 9, wherein the suspending arm comprises a protecting member, the protecting member wraps the end of the suspending arm close to the fixing portion.

11. The wheel axle lifter of claim 1, wherein the wheel axle lifter further comprises a damp mechanism, the damp mechanism comprises a bearing rod and a second airbag, the bearing rod is capable of pivoting, the bearing rod is disposed between the fixing portion and the wheel axle, the second airbag is disposed at the end of the suspending arm away from the fixing portion.

12. The wheel axle lifter of claim 11, wherein the suspending arm comprises a protecting member, the protecting member wraps the end of the suspending arm close to the fixing portion.

* * * * *